United States Patent [19]

Ubero

[11] Patent Number: 5,320,447
[45] Date of Patent: Jun. 14, 1994

[54] BASE STRUCTURE, PARTICULARLY SUITABLE FOR TENNIS COURTS, A TENNIS COURT AND A METHOD OF BUILDING A TENNIS COURT

[75] Inventor: Vicente G. Ubero, Curitiba, Brazil

[73] Assignee: Clayther International - Technology Transfers Ltd., The Bahamas

[21] Appl. No.: 930,693
[22] PCT Filed: Feb. 7, 1992
[86] PCT No.: PCT/BR92/00002
  § 371 Date: Oct. 7, 1992
  § 102(e) Date: Oct. 7, 1992
[87] PCT Pub. No.: WO92/14000
  PCT Pub. Date: Aug. 20, 1992

[30] Foreign Application Priority Data

Feb. 8, 1991 [BR] Brazil .................. 7100271

[51] Int. Cl.$^5$ .................. E01C 13/00; E01C 7/12
[52] U.S. Cl. .................. 404/31; 404/17
[58] Field of Search .................. 273/29 R; 404/27, 31, 404/32, 71, 72, 17; 405/50; 472/92; 427/136; 501/149

[56] References Cited

U.S. PATENT DOCUMENTS

| | | | |
|---|---|---|---|
| 2,648,603 | 8/1953 | Jenin | 427/136 |
| 3,661,604 | 5/1972 | Artmann | 106/98 |
| 3,754,954 | 8/1973 | Gabriel et al. | 106/97 |
| 4,515,839 | 5/1985 | Broaddus et al. | 428/17 |
| 4,523,755 | 6/1985 | Turba | 404/31 X |

FOREIGN PATENT DOCUMENTS

| | | |
|---|---|---|
| 066099 | 12/1982 | European Pat. Off. |
| 151040 | 1/1903 | Fed. Rep. of Germany |
| 3112990 | 10/1982 | Fed. Rep. of Germany |
| 767138 | 7/1934 | France .................. 94/7 |
| 2442916 | 6/1980 | France |
| 307252 | 8/1955 | Switzerland |
| 581233 | 10/1976 | Switzerland |

OTHER PUBLICATIONS

Table 21-12, U.S. Sieve Series and Tyler Equivalents, Chemical Engineers' Handbook, Fifth Edition, pp. 21-41 (1973).

*Primary Examiner*—Ramon S. Britts
*Assistant Examiner*—James A. Lisehora
*Attorney, Agent, or Firm*—Beveridge, DeGrandi, Weilacher & Young

[57] ABSTRACT

The invention refers to a base structure, particularly for tennis courts, comprising a top layer consisting of a solid microporous plate comprising a mixture from 50% to 98% fine clay and 2% to 50% cement, the thickness of the top layer being of at least 2 cm in the non-compacted state, wherein the solid microporous plate results from chemical reaction by means of water added to said mixture. The invention also provides a tennis court, the surface of which is inclined at least 0.25% as to permit excess water to flow towards the center or one side of the court. A method of building such a court is also described.

20 Claims, 1 Drawing Sheet

BASE STRUCTURE, PARTICULARLY SUITABLE FOR TENNIS COURTS, A TENNIS COURT AND A METHOD OF BUILDING A TENNIS COURT

The present invention refers to a base structure, particularly suitable for tennis courts, to a tennis court and to a method of building a tennis court.

Court structures for tennis courts and for the practice of other sports are prepared in accordance with various techniques, depending upon the desired particularities and/or characteristics of the sport for which the court is intended.

In particular, lawn tennis courts, which are known since the eighteenth century, originally had grass playing surfaces. Such surfaces have the disadvantages of producing a very fast game since the ball tends to slide more than bounce on the grass with the result that it loses very little speed on contact. Besides, this type of playing surface involves high costs to maintain the grass and it becomes unsuitable for play during rain and takes a long time to recover satisfactory playing conditions.

Later clay ("saibro") courts were developed. For the purposes of the present specification and claims, "clay" or "saibro" means clay based material that results from the weathering of granitic rock and is comprised essentially of sand, silt and clay and used for what is popularly known as a "clay court". "Clay" as thus defined has the capability of forming alloys, creating a surface of relative resistance, which, in good weather conditions, withstands the movements of the players without undergoing any significant deformation. The advantages of such a court base structure lie in the fact that it makes the ball reduce speed on bouncing and causes less injuries of an orthopedic nature since it is soft, and in particular also because of the presence of brick dust on its surface. Brick dust enables the player's feet to slide and turn with less friction when he stops abruptly, without these movements having to be supported only by the joints of the player's lower members.

The disadvantages of clay courts lie in the fact that the low consistency of their surfaces requires compacting the court regularly, thus interrupting the use thereof. The court loses its playing conditions quite rapidly under the action of rain due to the softening of the clay, which may lead to closure of the court for several days, depending upon the amount of water and the weather conditions. In order to attenuate this problem, known tennis courts have a complex draining system that consists of several layers of stones, pieces of brick and tile under the surface layer of clay, this, however, significantly increasing construction costs.

Besides, if the layer of clay becomes too dry, cracks may appear. A well-known way of attenuating this problem consists in placing hydroscopic salt on the surface for the purpose of maintaining some moistness. This does not eliminate the need for moistening the court periodically in dry climates, which represents a further burden on the cost of maintaining clay courts.

Another disadvantage of clay courts lies in the fact that the brick dust usually placed on their surface has a low specific weight and it is too thin, so that it is easily carried away by wind and rain and therefore requires constant replacement. In addition, the brick dust stains the balls, as well as the shoes and clothes of the player.

A more recent type of court structure is made up of several layers of stones, crushed rock and asphaltic emulsion, which provides an impervious hard court structure, which can be painted in several colors. Although this type of hard court can be dried after rain, thus providing almost immediate playing conditions, besides having a low maintenance cost, it does not allow the player's shoes to slide, as on gravel courts, and can cause injuries due to abrupt stops or turns. Besides, the hard and smooth surface of the asphalt provides a rapid game, since the ball slides more than bounces. Finally, a further disadvantage lies in the high costs involved in building a court of this type.

The prior art also includes carpet-like court structures made of rubber or a similar material. Although they are softer than the previously mentioned hard floor structures, these rubber court structures have the disadvantages mentioned above relating to the ball-bouncing characteristic that provides a very fast game, with a high friction between the surface and the soles of the shoes, which can cause serious injuries in the joints of the player's legs.

Examples of known court structures are disclosed in the following documents:

(a) French patent application 2,640,296 which discloses a base made of cement, sand and crushed rock;

(b) European patent 066,099 which discloses a court structure made of cement, brick dust and sand;

(c) French patent application 2,442,916 which discloses a court structure made up of porous cement and clay or expanded shale;

(d) French patent application 2,315,570 which discloses a court structure made up of a layer of bituminous resin, cement and sand, covered by another layer of acrylic resin, silicon sand, an emulsion and a pigment;

(e) German patent application 2,001,068 which discloses a court structure made up of rubber dust, a bituminous emulsion and cement or earth alkali metal oxide or hydroxide;

(f) British patent 932,032 which discloses a court structure with an upper layer made up of a moist layer of brick clay and bituminous stone coal;

(g) German patent application 2,714,068 which discloses a court structure having a base layer made up of expanded clay, silicon sand, on which a layer of polystyrene, a layer of light concrete, a layer of plastic and a layer top layer of natural fibers;

(h) Japanese patent application 52,114,618 which discloses a court structure made up of tire fibers, cement and sand; and (i) U.S. patent application Ser. No. 4,826,350 which discloses a court structure made up of a mixture of natural son with hydraulic material such as cement, gypsum or lime.

The object of the present invention is basically to provide a playing court structure, particularly suitable for tennis courts, which will have the advantages of a conventional clay court, as described above, and which is easy and inexpensive to build, besides requiring little maintenance work.

This object is reached, in accordance with the present invention, by the fact that a top layer consisting of a solid microporous plate comprises a mixture from 50% to 98% fine clay (as hereinbefore defined) and from 2% to 50% cement, the thickness of said top layer being of at least 2 cm in the non-compacted state, wherein the solid microporous plate results from chemical reaction by means of water added to said mixture. Preferably, the top layer of the playing court structure is made of from 6% to 8% of cement and the balance of fine clay, an especially advantageous composition consisting in the application of about 92.9% of fine clay and 7.1% of cement. The thickness of the top layer is preferably greater than 4 cm in a non-compacted state.

Fine clay as hereinbefore mentioned is defined as being the clay powder or particles which can pass through a mesh 22.

As has been shown in practical tests, the association of clay and cement results in a flooring structure that has considerably different properties when compared to conventional clay flooring structures, while ensuring a soft surface with good ball-bouncing characteristics that is comfortable for the player. The clay becomes microporous, so that rain water can pass through the top layer into the base layer or into the soil without flooding it.

According to a preferred embodiment, a base layer of hydrophilic material having a thickness of at least 4 cm in the non-compacted state is applied directly to the ground soil and prior to the application of the top layer. Preferably, however, the base layer is at least 8 cm thick. For instance, the hydrophilic material may comprise residues of crushed stone or gross clay. This hydrophilic material base layer is intended to provide adjustments in any unevenness in the ground and, due to the characteristic of its material, to accumulate water and maintain the moistness of the top layer by evaporation or, more specifically, by a so-called vapor-transpiration process whereby water rises to the surface by a capillary effect through the micropores of the top clay-cement layer.

The compaction of either the top layer or both layers, according to the preferred embodiment, is of from 20% to 40%.

An additional advantageous effect can be obtained by applying fine stone dust having a particle size typically in the range of 0.8 to 0.9 mm. The advantages of applying stone dust instead of the traditional brick dust are that stone dust acts as micro ball bearings under the soles of the player's shoes, which facilitates turning of the shoes and avoids sudden stops that could cause injuries to the player's joints, apart from the fact that the higher specific weight of stone dust reduces loss due to the action of the wind and rain. Besides, stone dust does not stain the ball and the player's clothes. Preferably the dust does not contain ores, such as quartz, that may reflect light.

Both the surface of the court and the stone dust may be artificially colored or painted, in which case the dust should come from a porous stone, such as marble, so that it can absorb the coloring material.

For building tracks designed for racing, rubber powder can be added to the floor structure of the present invention, especially tire scrapings, for the purpose of imparting greater smoothness to the surface and a better degree of impact.

Further according to the present invention a tennis court having the above-described structure has a surface which has an inclination of at least 0.25%, preferably ca. 0.33%. Preferably each side of the court has this inclination towards the center line, that is the court, to say, towards the net. This inclination allows the water to drain out of the court when, after a strong rain, the soil is saturated and cannot absorb any more water. According to an advantageous embodiment, a channel is provided under the region of the net to drain water that flows in that direction. Such channel may comprise an essentially horizontal (slightly inclined) pipe which communicates with the surface by means of vertical tubes provided with drain grids at their upper ends, as will be described later in greater detail.

According to another embodiment of the invention, the court has a lateral inclination instead of an inclination towards its center as above. The whole surface the court can be flat and also inclined at at least 0.25%, but preferably about 0.33%, from one side to the other, the drainage channel being provided along the lowest side of the court.

According to the invention, a method is also provided for the construction of a tennis court with the new structure of the invention, which comprises the following steps:

flattening and compacting the ground on which the court will be made;
preparing a dry mixture of 50% to 98% fine clay and 2% to 50% cement;
covering the ground with an at least 2 cm thick layer of the said dry mixture to provide a top layer;
subjecting said mixture to compaction of from 20% to 40%; and
watering the surface of the court so that the whole top layer is impregnated with water as to cause the dry mixture to form a solid microporous block or plate by chemical reaction.

The watering of the dry mixture of the clay and cement powders will initiate a chemical process, i.e., the so called "cement cure", which will transform the mixture of both powders in a solid substance, creating a compact layer which is micro-porous and relatively soft when compared to the known hard courts. This layer is capable of resisting to the movements of the player without deforming like known clay courts. The surface of the court according to the invention will remain smooth and requires no further flattening or compaction steps. After watering, the surface of the court should remain untouched for at least 48 hours.

According to an embodiment of the process of the invention, before providing a top layer, the ground can be covered with a layer of residues of crushed stones or gross clay, which is then compacted in the range of 20%-40%, in order to provide a base layer.

According to another advantageous embodiment, after the steps of compacting the base and top layers, the latter can be subjected to a flattening in order to ensure a greater evenness of the surface.

If, according to the present invention, each half of the court has an inclination towards the center, or if the whole court is flat and inclined from one side to the other, the method for building the court will also comprise the steps of flattening and compacting the ground with a inclination equal to or greater than 0.25%; preparing a channel at least next to the center of the court or on one side of the same, which channel has an inclined bottom; and installing a tube within the channel, said tube having a plurality of accesses to the surface of the court.

A preferred embodiment also comprises the steps of fixing plastic ribbons, e.g. made of PVC, with a width of ca. 5 cm and a thickness of ca. 2 mm to the court as demarcatory lines by means of fixing nails, and applying a compact roller over the fixed ribbons as to provide a surface free of protuberances.

As a final step, stone dust can be spread over the structure as mentioned previously.

The present invention will hereinafter be described in greater detail, by way of example, with reference to the accompanying drawings, in which.

Figure 1:
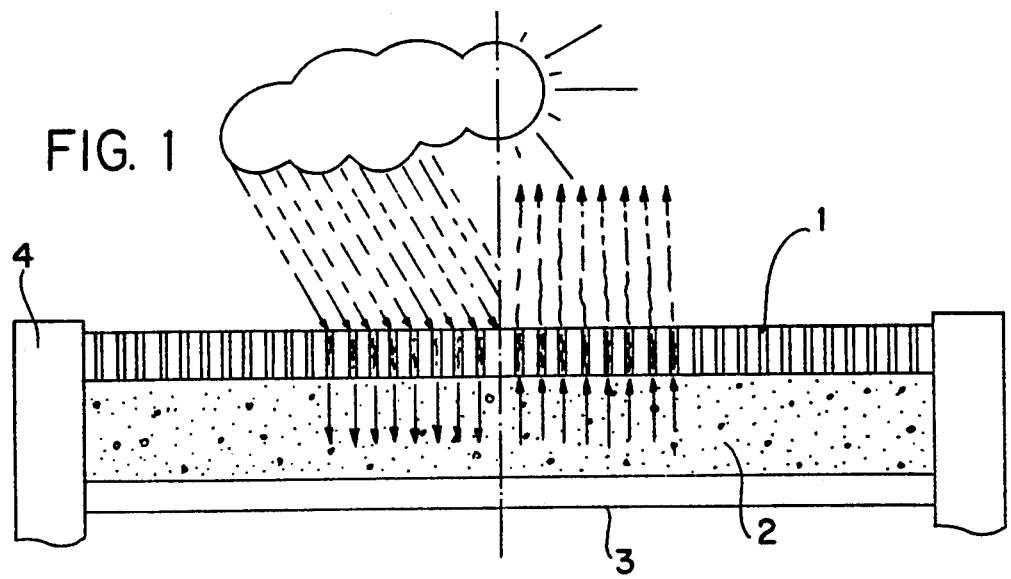
FIG. 1 is a schematic sectional view of one embodiment of the structure according to the invention.

The base structure of FIG. 1 comprises a top layer 1 of fine clay (as hereinbefore defined) and cement and a base layer 2, for example, of residues of crushed stones. Base layer 2 lies on the surface of the natural soil 3, although it should be noted that, depending on the characteristics of the soil, it is sometimes possible to eliminate the base layer altogether and apply the top layer directly over the soil. A retaining wall 4 may be provided around the base structure, which penetrates the soil 3 below base layer 2 and has a top edge leveled with or a little above the surface of top layer 1.

On the left side of FIG. 1, rain water penetrates through the top layer 1 of the structure and is absorbed by bottom layer 2 and by the natural soil 3. On the right side, evaporation and capillary effects cause humidity to rise through upper layer 1, thus maintaining its humidity and lowering the temperature of its surface. As a result, the temperature of the court is pleasant even on a very hot day.

Figure 2:
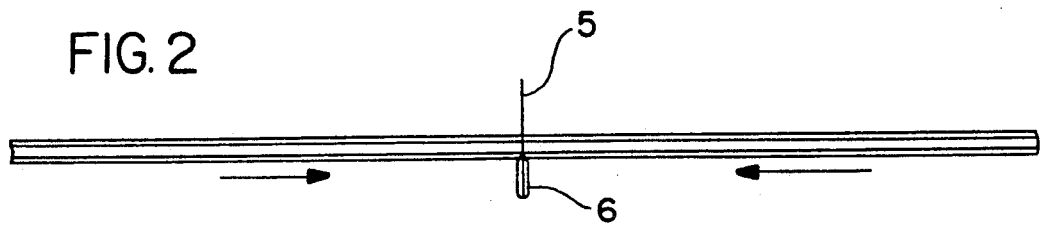
FIG. 2 is a schematic side view of a court with an inclined surface.

FIG. 2 shows a tennis court having its surface inclined at about 0.33% towards the net 5, as indicated by the arrows. The drainage system 6 lies under or next to the net so as to collect water flowing towards the center of the court.

Figure 3:
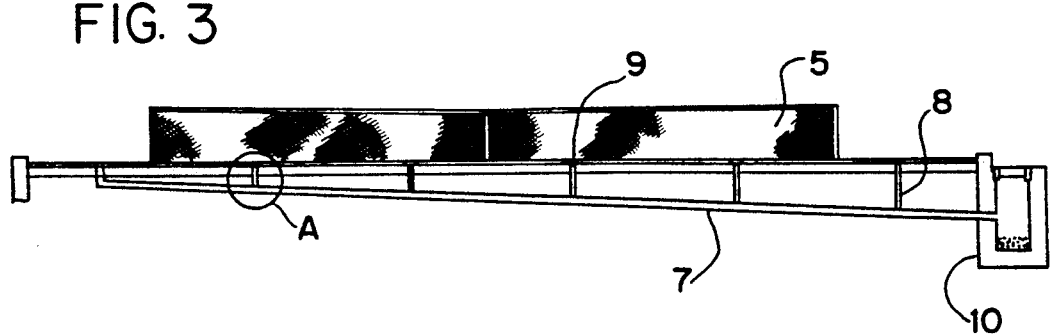
FIG. 3 is a schematic sectional side view of a preferred embodiment of a drainage system for the court of FIG. 2.
Figure 4:
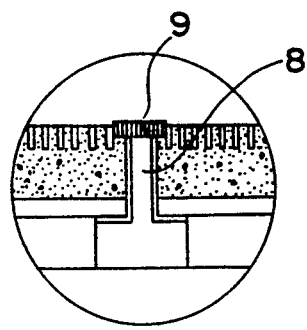
FIG. 4 an enlarged view of detail A in FIG. 3.

FIG. 3 shows that a pipe 7 is installed within a channel of the drainage system of FIG. 2, which lies in an inclined position towards a manhole 10 and which is connected to the surface by means of vertical tubes 8, the upper ends of which are provided with drainage grids 9, as shown in more detail in FIG. 4. The grids can be flush with the surface of the court, but they preferably lie about 3 mm above, so that the protuberance thus formed can retain the stone dust which would otherwise be drained away with the water. Pipe 7 terminates in the manhole 10 on the bottom of which any stone dust that is still carried into the drainage system settles. The stone dust can thus be recuperated and re-applied to the surface of the court.

Although only a few embodiments have been described, it is understood that the present invention is not limited thereto, variations within the same concept being permissible.

What is claimed is:

1. A base structure, particularly suitable for tennis courts, including a top layer which is a solid monolithic microporous plate comprising a compacted and cured mixture of from 50% to 98% fine clay particles which can pass through a mesh 22, and from 2% to 50% cement, the thickness of said top layer being at least 2 cm before compaction and curing, said solid microporous plate resulting from chemical curing on the addition of water to said mixture after in situ compaction.

2. A base structure according to claim 1, in which said top layer comprises from 6% to 8% cement.

3. A base structure according to claim 2, in which said top layer comprises from 7.1% cement and about 92.9% fine clay.

4. A base structure according to claim 1, in which said thickness of said top layer is greater than 4 cm before compaction and curing.

5. A base structure according to claim 1, in which a base layer of hydrophilic material having a thickness of at least 4 cm in a non-compacted state is applied directly over the ground, below said top layer.

6. A base structure according to claim 5, in which at least one of said top layer and said base layer is compacted in the range of 20% to 40%.

7. A base structure according to claim 5, in which said base layer has a thickness of more than 8 cm.

8. A base structure according to claim 5, in which said hydrophilic material includes residues of crushed stones.

9. A base structure according to claim 1, in which at least one of said top layer and said base layer is compacted in the range of 20% to 40%.

10. A base structure according to claim 1, in which stone dust having a particle size in the range of 0.8 to 0.9 mm is applied to the surface of said top layer.

11. A base structure according to claim 10, in which said top layer and said stone dust are artificially painted or colored, said dust being of a porous stone.

12. A base structure according to claim 1, in which rubber powder is incorporated in the material of said top layer.

13. A tennis court comprising a base structure according to claim 1, said top layer having an upper surface with an inclination of at least 0.25%.

14. A tennis court according to claim 13, in which said inclination is about 0.33%.

15. A tennis court according to claim 13, in which said inclination is towards one side of the court.

16. A method for building a base structure suitable for tennis courts including a top layer which is a solid microporous plate, said method including the following steps:
   flattening and compacting the ground on which the base structure will be made;
   preparing a dry mixture of 50% to 98% fine clay particles which can pass through a mesh 22, and 2% to 50% cement;
   covering the ground with an at least 2 cm thick layer of the said dry mixture to provide a top layer;
   subjecting said mixture to compacting of from 20% to 40%; and
   watering the surface of the court so that the whole top layer is impregnated with water as to cause the dry mixture to form a solid microporous block or plate by chemical curing.

17. A method according to claim 16 including the step of covering the ground with a layer comprising residues of crushed stone, and compacting said layer in the range 20%-40% to provide a base layer, prior to said step of covering the ground to provide said top layer.

18. A method according to claim 17, including the step of flattening said base layer and said top layer after they have been compacted.

19. A method according to claim 16, including the step spreading stone dust on said top layer after said top layer has been compacted.

20. A method according to claim 16, including the steps of
   providing said base structure with an inclination of at least 0.25% towards one side thereof;
   preparing a channel along said one side of said court, said channel having an inclined bottom; and
   installing within the channel a tube having a plurality of accesses to the surface of said base structure.

* * * * *